(12) United States Patent
Robideau et al.

(10) Patent No.: US 12,351,435 B2
(45) Date of Patent: Jul. 8, 2025

(54) ROTATION HOISTS

(71) Applicant: The Boeing Company, Chicago, IL (US)

(72) Inventors: Jeffrey A. Robideau, Hood River, OR (US); Timothy I. Crase, Washougal, WA (US); David C. Wolff, Longview, OR (US); Keith P. White, Sandy, OR (US); Gary E. Georgeson, Tacoma, WA (US); Boun Sinvongsa, Portland, OR (US); Ralph A. Picarello, Jr., Tempe, AZ (US); Thomas A. Mazur, Mesa, AZ (US); Paul W. Liner, Jr., Scappoose, OR (US)

(73) Assignee: The Boeing Company, Arlington, VA (US)

( * ) Notice: Subject to any disclaimer, the term of this patent is extended or adjusted under 35 U.S.C. 154(b) by 903 days.

(21) Appl. No.: 17/525,503

(22) Filed: Nov. 12, 2021

(65) Prior Publication Data

US 2022/0332548 A1      Oct. 20, 2022

Related U.S. Application Data

(60) Provisional application No. 63/175,984, filed on Apr. 16, 2021.

(51) Int. Cl.
*B66C 1/16* (2006.01)
*B62B 3/02* (2006.01)
*B66C 13/08* (2006.01)

(52) U.S. Cl.
CPC .................. *B66C 1/16* (2013.01); *B62B 3/02* (2013.01); *B66C 13/08* (2013.01); *B62B 2203/60* (2013.01)

(58) Field of Classification Search
CPC ......... B66C 1/105; B66C 1/107; B66C 13/08; B66C 13/085; B66C 1/16; B62B 3/02; B62B 2203/60; B62B 2206/02
USPC .... 294/68.26, 68.27, 67.21, 67.5, 81.3, 81.4
See application file for complete search history.

(56) References Cited

U.S. PATENT DOCUMENTS

| | | | | |
|---|---|---|---|---|
| 1,441,340 A | * | 1/1923 | Goldberg | B22D 45/00 294/68.3 |
| 2,703,252 A | * | 3/1955 | Blackwell | B66C 1/62 294/81.4 |
| 4,496,275 A | * | 1/1985 | Harp | B66C 13/08 414/754 |
| 4,930,826 A | * | 6/1990 | Perren | A62C 3/0235 294/68.27 |

(Continued)

OTHER PUBLICATIONS

T&T Manufacturing, LLC, Trunion Carts, https://www.ttmfg.com/products/trunion-carts/, last accessed Mar. 30, 2022, Spooner, WI, 3 pages.

*Primary Examiner* — Stephen A Vu
(74) *Attorney, Agent, or Firm* — Hanley, Flight & Zimmerman, LLC

(57) ABSTRACT

Rotation hoists are disclosed. A disclosed example rotation hoist to support a component includes a platform having a first end and a second end opposite the first end, a body supported by the platform, a rotator supported by the body, the rotator couplable to the component at a first position of the component, and an arm extending from the rotator, the arm couplable to the component at a second position of the component different from the first position, the rotator to rotate the arm to rotate the component.

20 Claims, 17 Drawing Sheets

(56) References Cited

U.S. PATENT DOCUMENTS

| | | | | |
|---|---|---|---|---|
| 5,240,298 | A | * | 8/1993 | Teaby ..................... B66C 1/107 |
| | | | | 294/81.4 |
| 5,429,490 | A | * | 7/1995 | Myers ....................... B66F 9/18 |
| | | | | 425/436 R |
| 5,641,188 | A | * | 6/1997 | Phillips ..................... B66C 3/00 |
| | | | | 294/68.27 |
| 8,000,835 | B2 | * | 8/2011 | Friz ........................ B66C 13/08 |
| | | | | 294/67.5 |
| 8,585,346 | B2 | * | 11/2013 | Shonai ................... C30B 15/10 |
| | | | | 414/420 |
| 2017/0008739 | A1 | * | 1/2017 | Nguyen ................. B66C 13/18 |

* cited by examiner

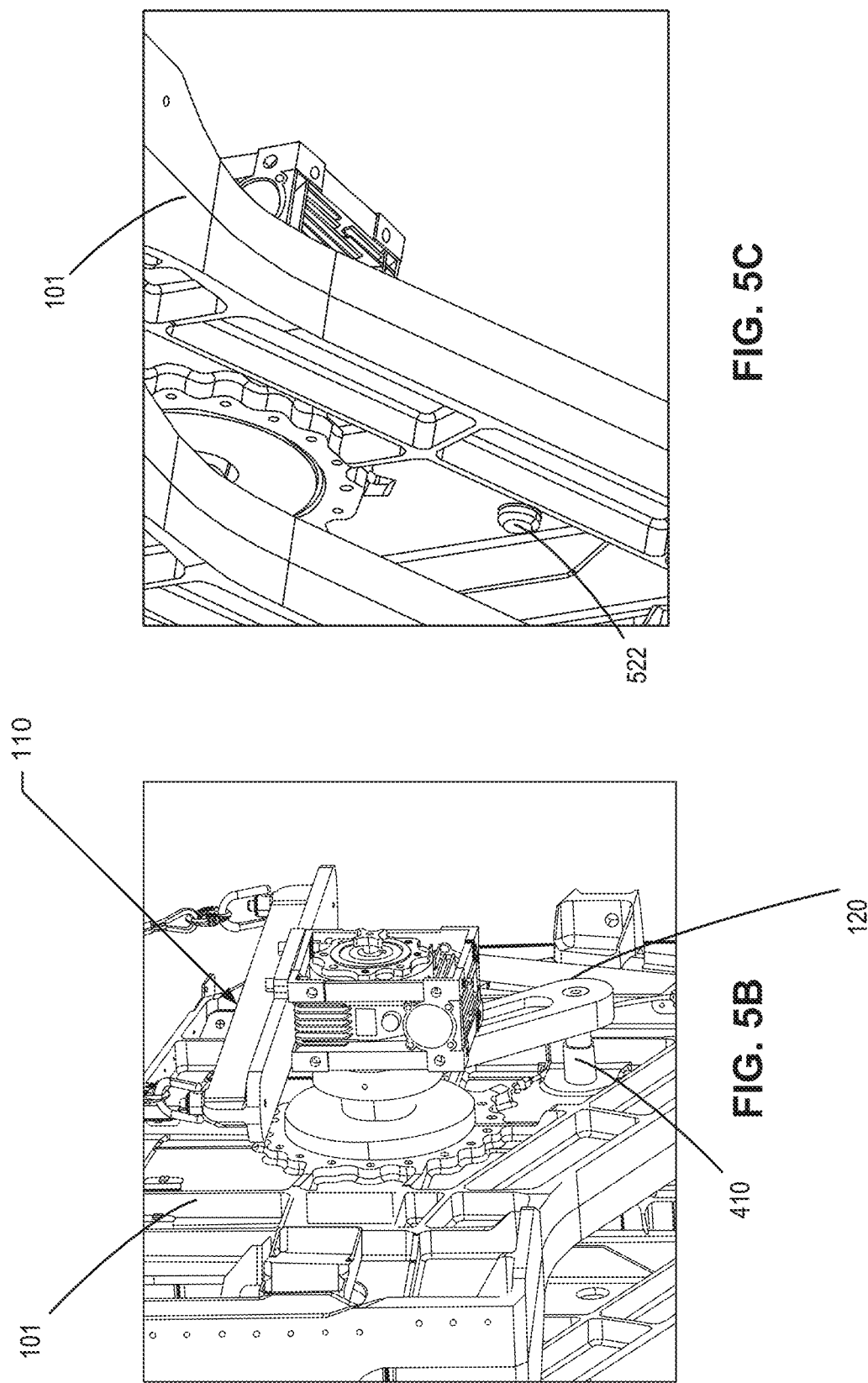

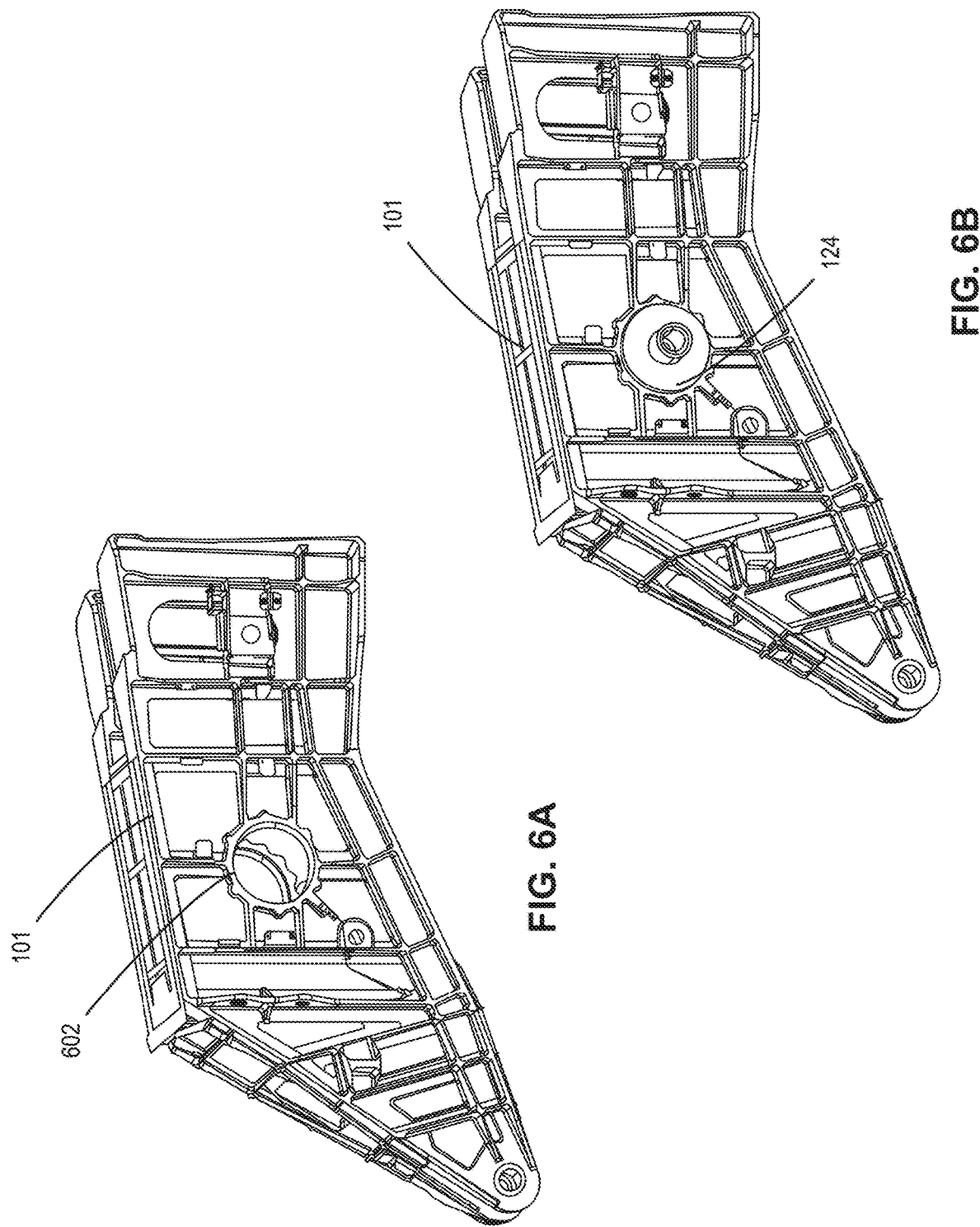

ROTATION HOISTS

RELATED APPLICATION

This patent claims priority to U.S. Provisional Patent Application No. 63/175,984, filed on Apr. 16, 2021. U.S. Provisional Patent Application No. 63/175,984 is hereby incorporated by reference in its entirety.

FIELD OF THE DISCLOSURE

This disclosure relates generally to supporting or moving objects and, more particularly, to rotation hoists.

BACKGROUND

In manufacturing environments, components (e.g., workpieces, assemblies, etc.) being manufactured can be relatively large in size and weight. Thus, manipulation of these components during assembly and/or processing can be difficult. Particularly, some components can be awkward to move, reorient and/or rotate based on overall dimensions, size, weight, aspect ratios, a center of gravity, etc.

SUMMARY

An example rotation hoist to support a component includes a platform having a first end and a second end opposite the first end, a body supported by the platform, a rotator supported by the body, the rotator couplable to the component at a first position of the component, and an arm extending from the rotator, the arm couplable to the component at a second position of the component different from the first position, the rotator to rotate the arm to rotate the component.

An example assembly for supporting a component includes an insert to be inserted into the component at a first position of the component, a rotator to be releasably couplable to the insert, the rotator to be supported by a body, and an arm extending from the rotator, the arm to be inserted into the component at a second position of the component different from the first position, the arm to be rotated via the rotator.

An example method for moving a component includes coupling, at a first position of component, the component to a rotator supported by a platform, coupling, at a second position of the component different from the first component, an arm to the component, the arm extending from the rotator, and rotating, via the arm, the component.

An example tangible computer readable medium includes instructions which, when executed, cause at least one processor to determine an orientation of a component operatively coupled to a rotator at a first position of the component, the rotator supported by a platform, calculate an adjustment rotation of the component, and cause, via an arm operatively coupled to the rotator, the component to rotate based on the adjustment rotation, the arm coupled to the component at a second position of the component different from the first position.

BRIEF DESCRIPTION OF THE DRAWINGS

FIGS. 5A-5C are detailed views of portions of the example rotation hoist shown in FIGS. 1 and 2.

FIGS. 6A-6E illustrate example use of inserts with components according to examples disclosed herein.

Figure 1:
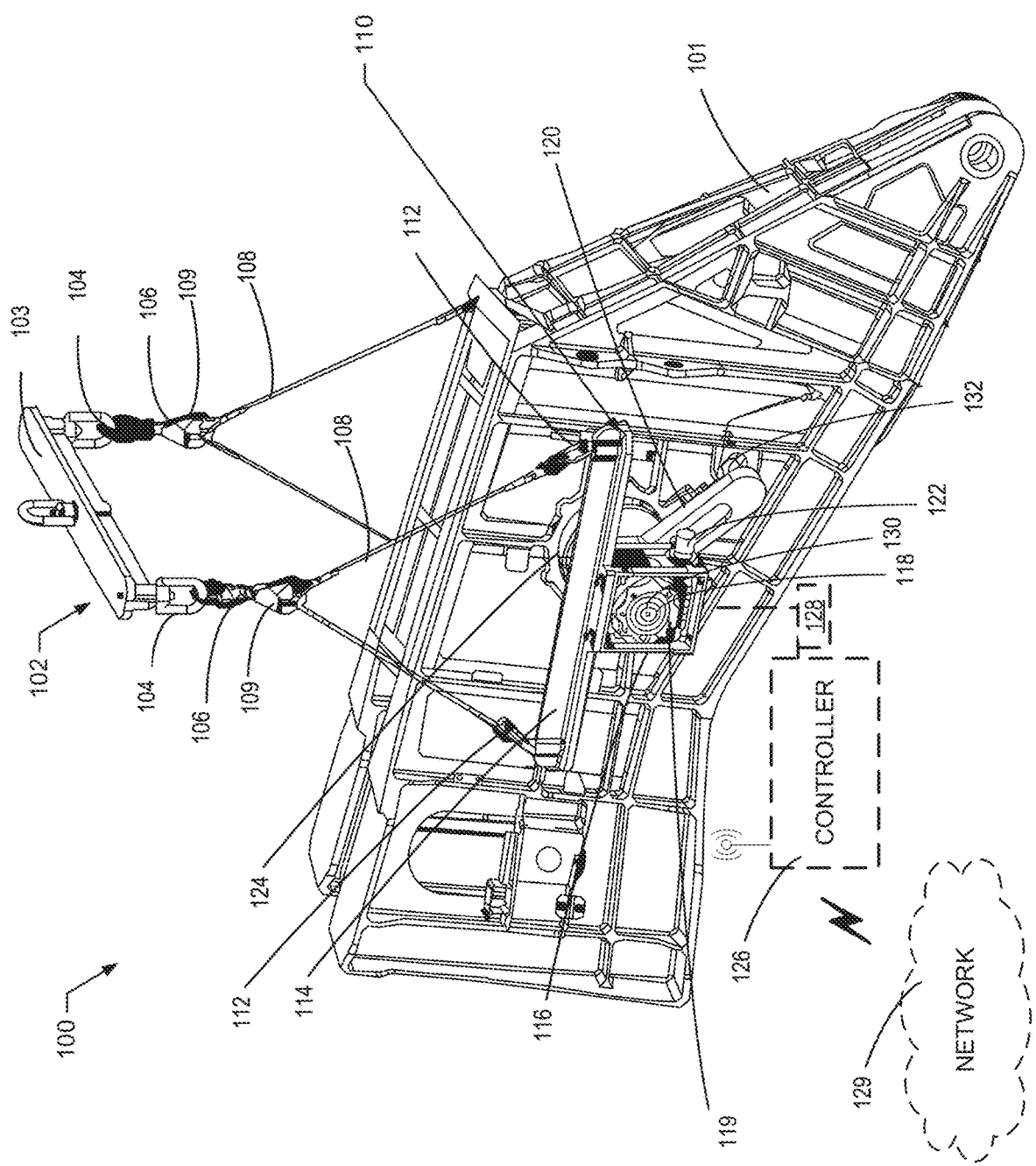
FIG. 1 illustrates an example rotation hoist in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Rotation hoists are disclosed. For manufacturing environments, different manufacturing processes, assembly and/or processing of a component (e.g., a workpiece, an assembly, an element, a piece, etc.) may require manipulation of the component, which can be difficult and time-consuming due to overall dimensions, size, an aspect ratio, a center of gravity, weight distribution, etc. of the component. As a result, the manipulation of the component can sometimes necessitate additional labor and associated costs.

Examples disclosed herein enable efficient and cost effective manipulation and/or movement (e.g., translational movement, rotational movement, etc.) of components and/or assemblies. Examples disclosed herein also enable relatively large components to be rotated, manipulated and moved with relative ease. Accordingly, examples disclosed herein can enable relatively shorter production time, as well as reduced labor times (e.g., reduced manufacturing station times). Further, examples disclosed herein can reduce a need for multiple operators at a manufacturing station. As a result, examples disclosed herein can reduce manufacturing costs, for example.

Examples disclosed herein utilize a body supported by a platform. The platform can be suspended from above or by a ground structure, such as a ground-based cart (e.g., a user-operated movable cart). According to examples disclosed herein, a rotator is supported by the platform and/or a body supported by the platform. The example rotator is implemented to rotate a component (e.g., a workpiece, an assembly, a portion of assembly, etc.). According to examples disclosed herein, the rotator can be implemented as a gearbox to provide a mechanical advantage to an operator. Further, the example rotator can rotate the component via an arm (e.g., a crank arm) extending from a pivot positioned at a first position of the component. The arm can be rotated about the pivot and is coupled (e.g., rotationally coupled) to the component at a second position of the component that is different from the first position.

In some examples, the platform is supported by at least one cable (e.g., two cables, four cables, etc.) for a hoist configuration. In some examples, a stop or brake (e.g., a user-operated stop or brake) is implemented to prevent the aforementioned arm from rotating. In some examples, the rotator includes and/or is defined by a gearbox. In some examples, an insert is inserted into the component and the rotator is couplable to the component via the insert. Additionally or alternatively, the rotator is moved by an input. The aforementioned input can be rotated via a user-operated tool (e.g., a user tool, a hand tool, a robot mounted tool, an operator tool, etc.), for example. In some examples, a degree to which the component is rotated is controlled based on a stage of processing of the component (e.g., during a manufacturing process).

As used herein, the term "rotator" refers to a component, a device and/or an assembly to rotate another object. Accordingly, the term "rotator" can refer to, but is not limited to, gearing, a gearbox, a motor, an actuator, a transmission, etc. As used herein, the term "component" refers to an object that is to be manipulated and/or moved. Accordingly, the term "component" can refer to a workpiece, a component and/or assembly that is to be moved. As used herein, the term "arm" refers to a component, a device and/or an assembly that is rotated and/or pivoted to cause movement of another component.

FIG. 1 illustrates an example rotation hoist 100 in accordance with teachings of this disclosure. As can be seen in the view of FIG. 1, the rotation hoist 100 is depicted carrying and/or supporting a component 101, which is an assembly to be processed during multiple manufacturing steps (e.g., painting, assembly, welding, machining, etc.)

The rotation hoist 100 of the illustrated example includes a support assembly 102 which, in turn, includes a support beam 103 and ring supports 104. In this example, the ring supports 104 carry cable supports 106. Further, the cable supports 106 support and/or suspend cables 108 via eyelets 109. In the illustrated example, the cables 108 support at least one rotation assembly 110 which, in turn, includes mounts 112 attached to the cables 108, a platform 114, a body 116, a rotator (e.g., a rotation assembly, a gearbox, a transmission, a rotational joint, a speed reducer, a torque amplifier, etc.) 118, an arm 120, and an input (e.g., an operator input, an operator input socket, etc.) 122. The example support beam 103 and/or the platform 114 is at least partially composed of metal (e.g., aluminum, steel, etc.). In this example, the component 101 includes an insert 124 coupled thereto. The insert 124 may be at least partially composed of a plastic material (e.g., a Delrin® material, a polymer, etc.). In some examples, the rotation hoist 100 includes a controller 126 and a motor/actuator 128, which can be operatively coupled to the rotation assembly 110. In some such examples, the controller 126 can be communicatively coupled to a network 129.

To support the component 101, the support assembly 102, which may be held and/or coupled to a crane or other lifting equipment, carries the cables 108 which, in turn, support the component 101 at both sides thereof. As a result of having the cables 108 support the component 101 at its sides (e.g., side panels side surfaces, etc.) via the platforms 114, the component 101 is relatively balanced for subsequent movement and/or manipulation. As mentioned above, the cables 108 are attached to the distal ends of the respective platforms 114. Further, in this example, one of the platforms 114 includes the body 116, which positions and/or supports the rotator 118. In the illustrated example, the rotator 118 is coupled to the component 101 at a first position 130 of the component 101 (e.g., a rotational axis of the rotator 118 is centered at the first position 130).

To rotate the component 101, the rotator 118, which includes and/or implemented as a gearbox 119 in this example, causes the arm 120 to pivot about a center (e.g., a center axis of the rotator 118) that is located at the aforementioned first position 130. In particular, a rotational motion of the rotator 118 is translated to rotational motion of the arm 120 and, in turn, the component 101. In the illustrated example, the arm 120 is coupled (e.g., pivotably coupled) to the component 101 at a second position 132 of the component 101 that is different from the first position 130. The second position 132 can correspond to an aperture of the component 101. In this example, the arm 120 does not rotate relative to the component 101 during motion of the arm 120. In other examples, however, the arm 120 can rotate and/or pivot relative to the component 101 about the second position 132 during motion thereof.

In this example, the rotation of the rotator 118 and, thus, the component 101 is caused by a rotation of the input 122. In particular, the rotation of the rotator 118 causes the component 101 to move, pivot and/or rotate (e.g., to a specified degree corresponding to a specific manufacturing process step). In the illustrated example, the aforementioned gearbox 119 of the rotator 118 operates at a gear ratio of 100:1 to provide a mechanical advantage at the input 122. However, any other appropriate gear ratio and/or gearing type can be implemented instead (e.g., 5:1 10:1, 20:1, 50:1, 75:1, 200:1, 500:1, etc.). The gearbox 119 can be implemented as a worm drive, a gear drive, or any other appropriate type of drive mechanism. In some examples, the input 122 can be rotated via a user-operated or robot-based tool (not shown). In such examples, a degree of rotation of the input 122 can be related (e.g., proportional) to a degree of rotation of the component 101.

In other examples, the rotator 118 includes and/or is operatively coupled to the motor/actuator 128, which can be torque-limiting or speed-limiting. For example, the motor/actuator 128 is implemented in the rotator 118 and/or operatively coupled to the rotator 118 for assisted and/or powered movement of the component 101. In some such examples, the motor/actuator 128 can be controlled by the controller 126 to cause rotation of the component 101. Additionally or alternatively, in some examples, the rotator 118 implements a rotational stop or brake, such as a rotating crank by which rotation of the component 101 is stopped based on movement of a braking device (e.g., a plate or bar moved into a slot, etc.). In other examples, the rotator 118 includes and/or is coupled to a clutch to vary a degree of engagement between the input 122 and at least one of the rotator 118 or the arm 120.

Figure 2:
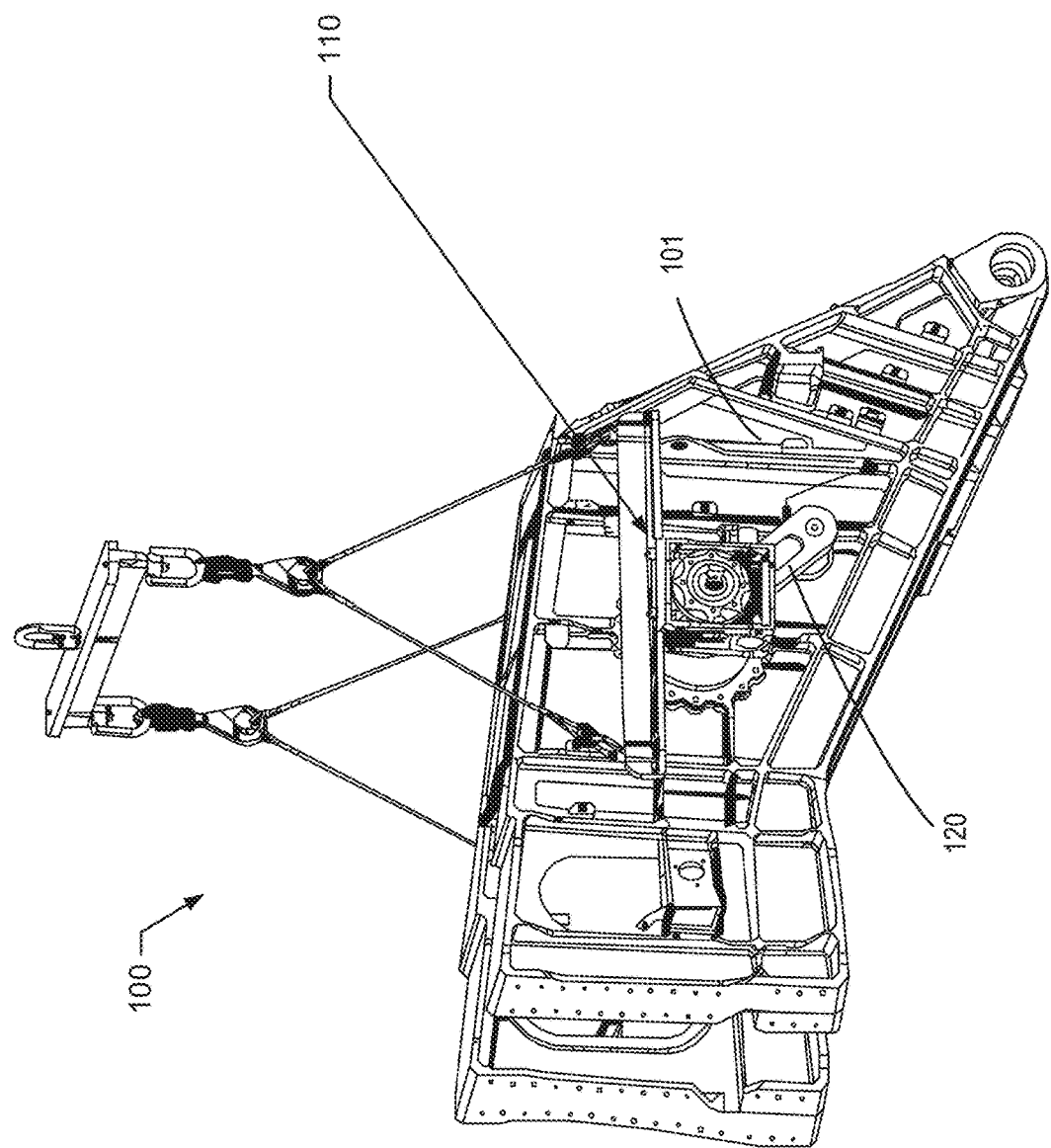
FIG. 2 is a rear side view of the example rotation hoist of FIG. 1.

FIG. 2 is a rear side view of the example rotation hoist 100 of FIG. 1. As can be seen in the illustrated example of FIG. 2, the component 101 is supported by the rotation hoist 100 such that the arm 120 holds and/or supports the component 101 at a defined orientation. Further, in some other examples, two of the rotation assemblies 110 are positioned at both sides of the component 101 (e.g., to the left and right of the component 101), thereby enabling rotation of the component 101 from either of the sides. In other words, in such examples, the component 101 can be rotated from either of its sides, thereby enabling greater flexibility for manufacturing operators, for example. In other examples, only one of the sides of the rotation hoist 100 includes the rotation assembly 110.

Figure 3:
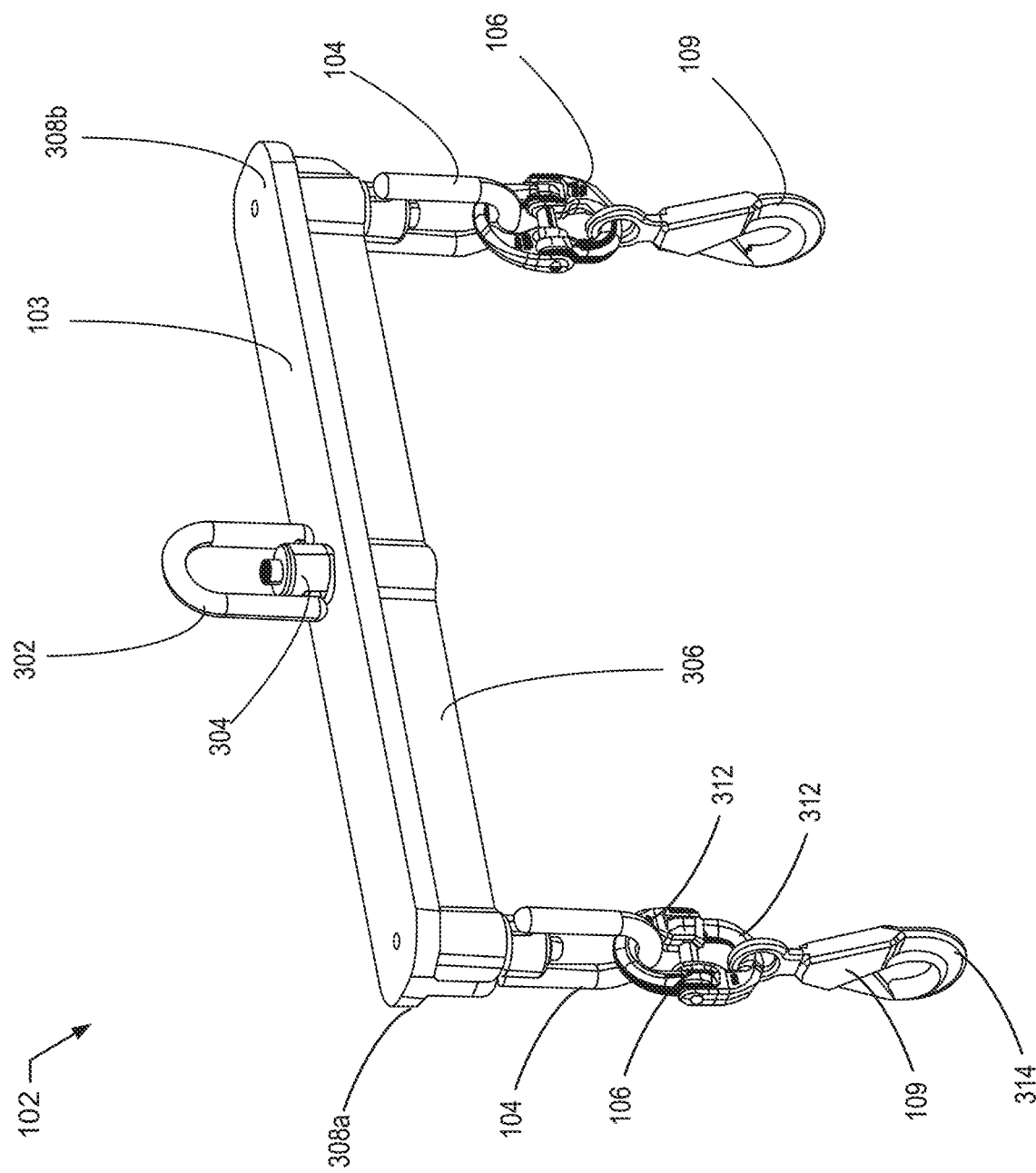
FIG. 3 illustrates an example platform of the example rotation hoist shown in FIGS. 1 and 2.

FIG. 3 illustrates the example support assembly 102 of the example rotation hoist 100 shown in FIGS. 1 and 2. In the illustrated example of FIG. 3, the support assembly 102 includes the support beam 103 that is supported via a center ring 302, which can swivel about a rotational joint 304. In this example, the support beam 103 includes a body 306 that exhibits a generally t-shaped cross-sectional profile and the body 306 extends between a first distal end 308a to a second distal end 308b of the support beam 103. However, any other appropriate cross-sectional profile can be implemented instead (e.g., circular, rectangular, ellipsoid, hexagonal, etc.). Further, the ring supports 104 are mounted and/or supported at the distal ends 308a, 308b. In this example, the cable supports 106 include rings 312 to be coupled to the ring supports 104 and the eyelets 109. Further, the example eyelets 109 include an openable portion 314 to move so that the cables 108 can be received, held and/or retained by the eyelets 109.

In operation, the center ring 302 is held and/or supported vertically to carry (e.g., hold up) the support beam 103. In particular, the support beam 103 is held at a substantially horizontal orientation (in the view of FIG. 3) when the cables 108 shown in FIG. 1 are supported by the cable supports 106 and/or the eyelets 109. In this example, the load from the cables 108 of FIG. 1 is generally similar and/or identical to facilitate a stability of the support beam 103.

Figure 4A:
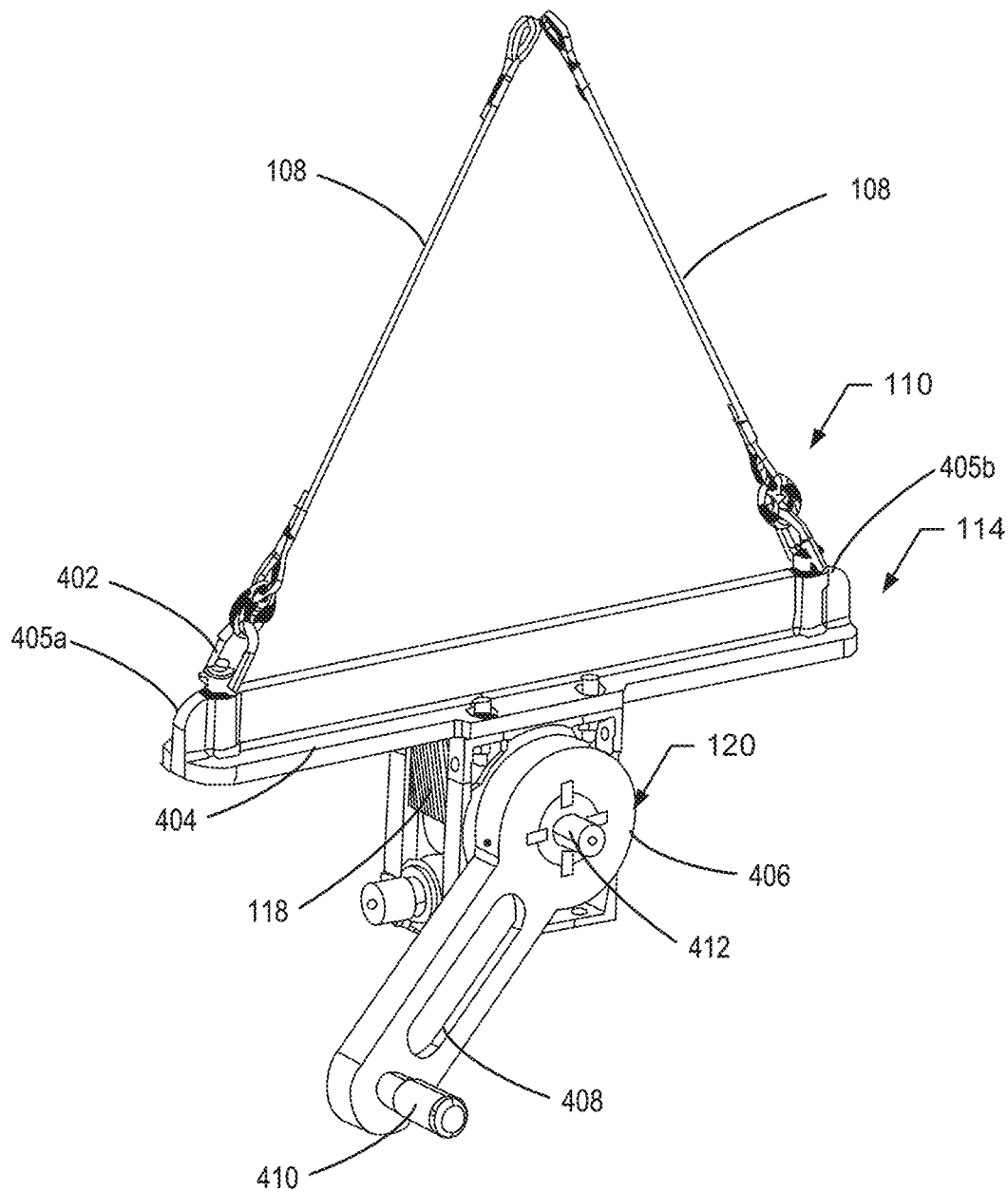
FIGS. 4A and 4B illustrate portions of the example rotation hoist shown in FIGS. 1 and 2.
Figure 4B:

FIGS. 4A and 4B illustrate portions of the example rotation hoist 100 shown in FIGS. 1 and 2. Turning to FIG. 4A, the example rotation assembly 110 is shown with the cables 108 shown attached thereto. In this example, the platform 114 supports the rotator 118, which is implemented as the gearbox 119 of FIG. 1 in this example. In turn, the platform 114 includes cable mounts (e.g., cable joint rings) 402 and a beam 404 with distal ends 405a, 405b. In this example, the beam 404 includes a generally t-shaped cross-sectional profile. However, any other appropriate cross-sectional profile can be implemented instead (e.g., circular, rectangular, ellipsoid, hexagonal, etc.). In the illustrated example, the arm 120 includes a base 406, a link (e.g., a span a beam, etc.) 408 that extends from the base 406, and a coupler pin 410. Further, the arm 120 includes and/or is operatively coupled to a pin 412.

FIG. 4B illustrates a portion of the example rotation hoist 100 that does not cause or drive rotation of the component 101 but, instead, supports the component 101 as the component 101 is rotated. In other words, the example portion depicted in FIG. 4B enables rotation of the component 101 with relatively little friction and/or resistance while the portion shown in FIG. 4A drives and/or causes rotation of the component 101. In the illustrated example of FIG. 4B, a pin 420, which may be identical to the pin 412 of FIG. 4A is shown extending from a mount (e.g., a bearing mount, a rotational mount, etc.) 422, which may house and/or position a bearing. In the illustrated example, the pin 420 extends from the mount 422 to be inserted into the component 101 shown in FIGS. 1 and 2. In this example, the pin 420 is to at least partially define an axis of rotation (e.g., in conjunction with the pin 412) of the component 101.

Figure 5A:
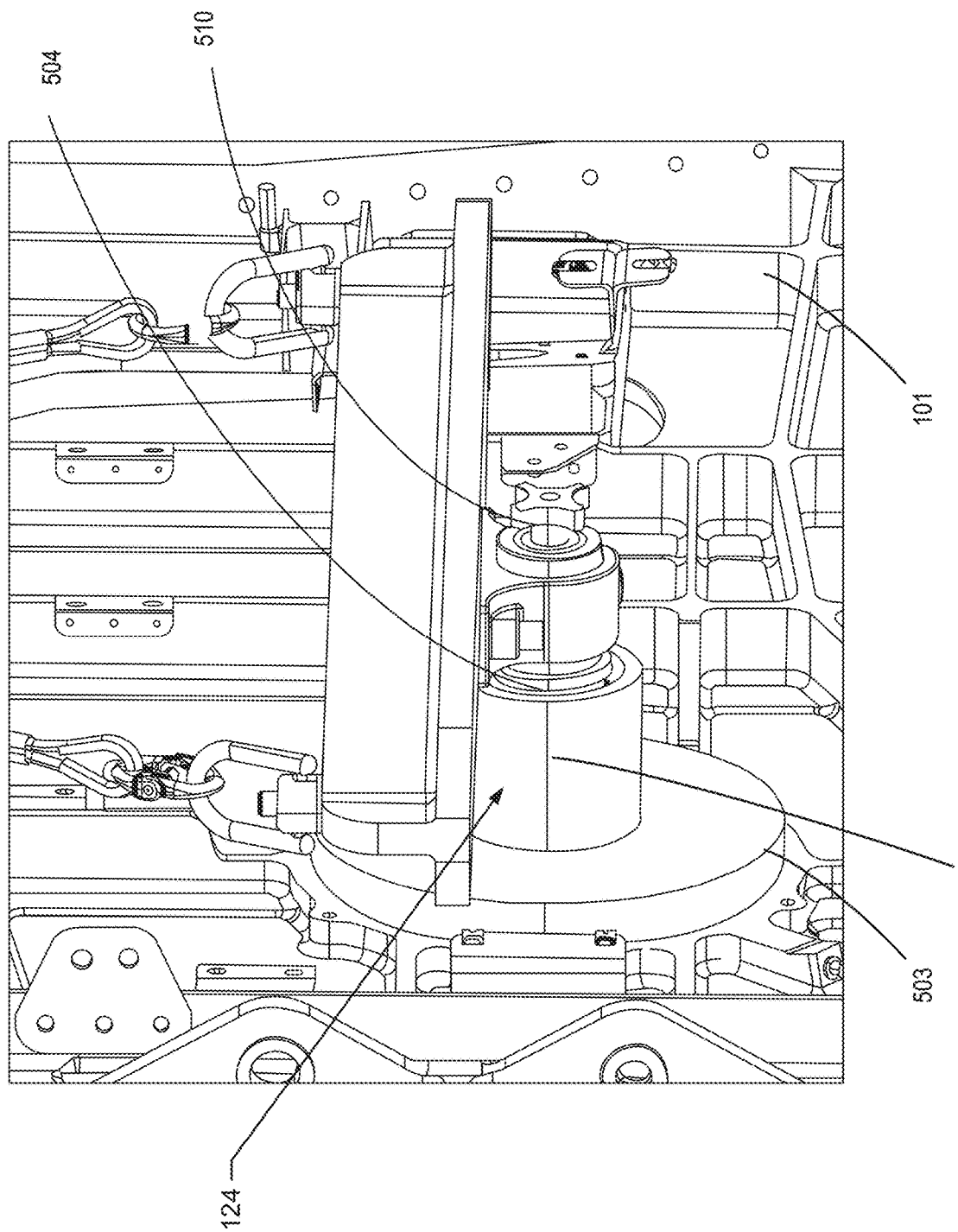

FIGS. 5A-5C are detailed views of portions of the example rotation hoist 100 shown in FIGS. 1 and 2. Turning to FIG. 5A, the example insert 124 is shown attached to the component 101. In this example, the insert 124 includes a shoulder 502 that extends from a base 503. Further, the pin 420 of FIG. 4B is inserted into a collar 504 that is disposed in the aforementioned shoulder 502. In this example, the collar 504 is to receive the pin 420 to enable rotation of the component 101 about the pin 420 (and the pin 412) as the arm 120 shown in FIGS. 1, 2 and 4A rotates the component 101. In other words, the insert 124 receives the pin 420 to at least define a rotational joint and/or axis corresponding to the component 101. In some examples, a lock (e.g., a clasp, a locking bolt) 510 is implemented to secure the rotation hoist 100 to the component 101 and/or the insert 124.

FIG. 5B depicts a portion of the rotation assembly 110 with the arm 120. In this example, only a single side of the rotation assembly 110 includes the arm 120 and another side of the rotation assembly 110 that is opposite of the first side includes the pin 420 of FIGS. 4B and 5A to enable rotation of the component 101. In the illustrated example, the coupling pin 410 is shown extending through and/or into the component 101.

Turning to FIG. 5C, an end 522 of the coupling pin 410 (of FIGS. 4A and 5B) is shown extending through at least a portion of the component 101. In some examples, the pin 410 only partially extends through the component 101. In some examples, the pin 410 defines a rotational joint or pivot associated with a distal end of the arm 120.

Figure 6D:
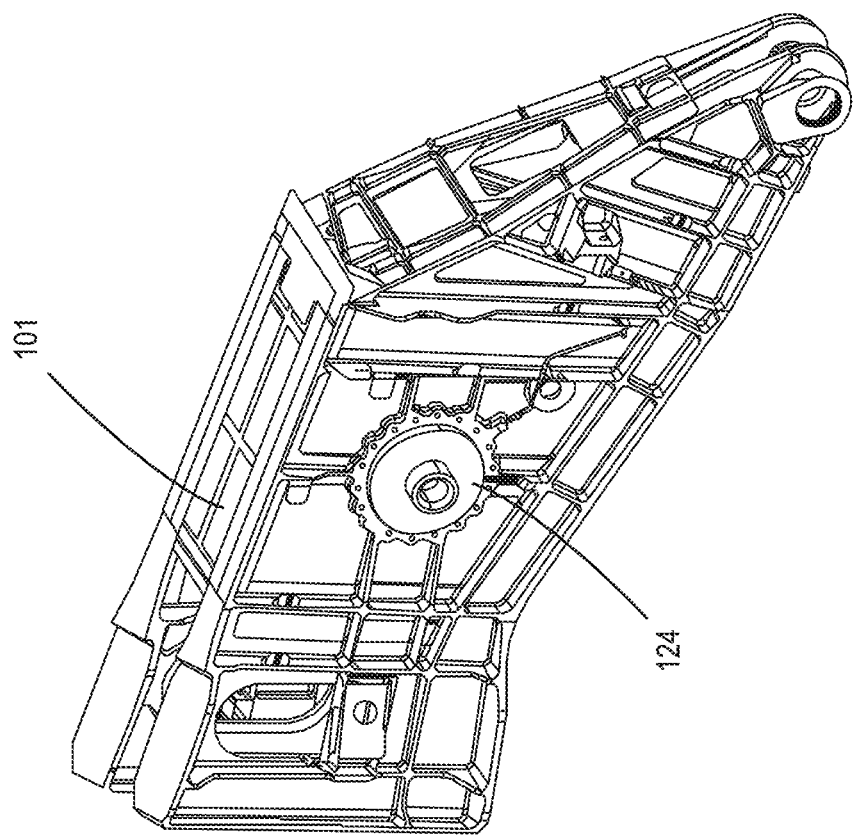

FIGS. 6A-6E illustrate example use of the inserts 124 with the components 101 according to examples disclosed herein. FIG. 6A depicts the component 101 without the insert 124 coupled thereto. In this example, the component 101 includes an aperture 602 to receive the insert 124.

In contrast to FIG. 6A, FIG. 6B depicts the component 101 with the insert 124. In some examples, the aperture 602 is defined onto the component 101 so that the rotation hoist 100 can carry and rotate the component 101.

Figure 6C:
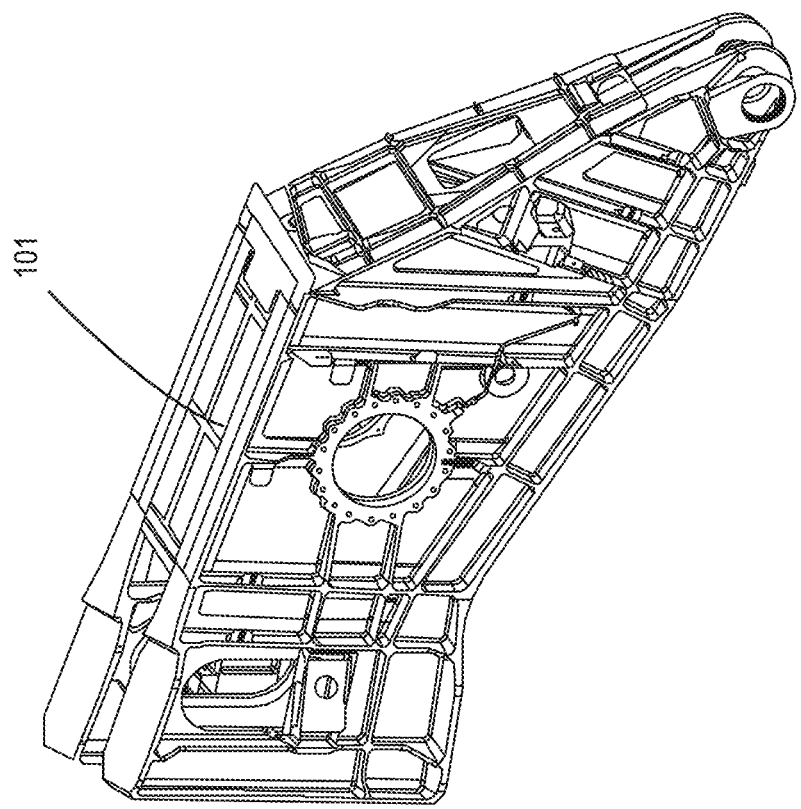

FIGS. 6C and 6D depict the component 101 without and with the insert 124, respectively. The example views of FIGS. 6C and 6D are on an opposite side from that shown in FIGS. 6A and 6B. In some examples, the inserts 124 are placed onto both sides of the component 101. In other examples, multiples ones of the inserts 124 are placed onto different portions and/or positions of the component 101 (e.g., along a single side of the component 101).

Figure 6E:
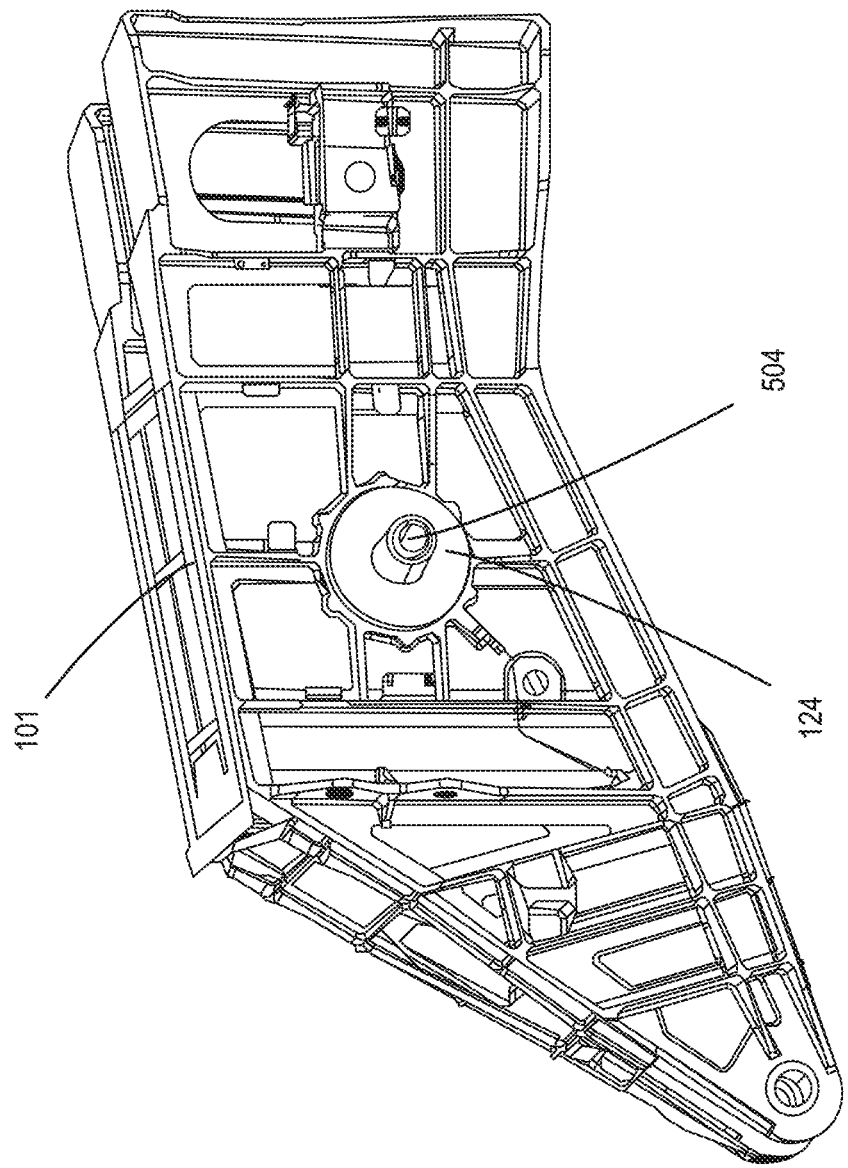

FIG. 6E depicts the component 101 having the insert 124 with the collar 504. In this example, the collar 504 is implemented to position and support the pin 412 or the pin 420, both of which are described above in connection with FIGS. 4A-5C. In some examples, the collar 504 has a friction fit to the pin 412 or the pin 420.

Figure 7:
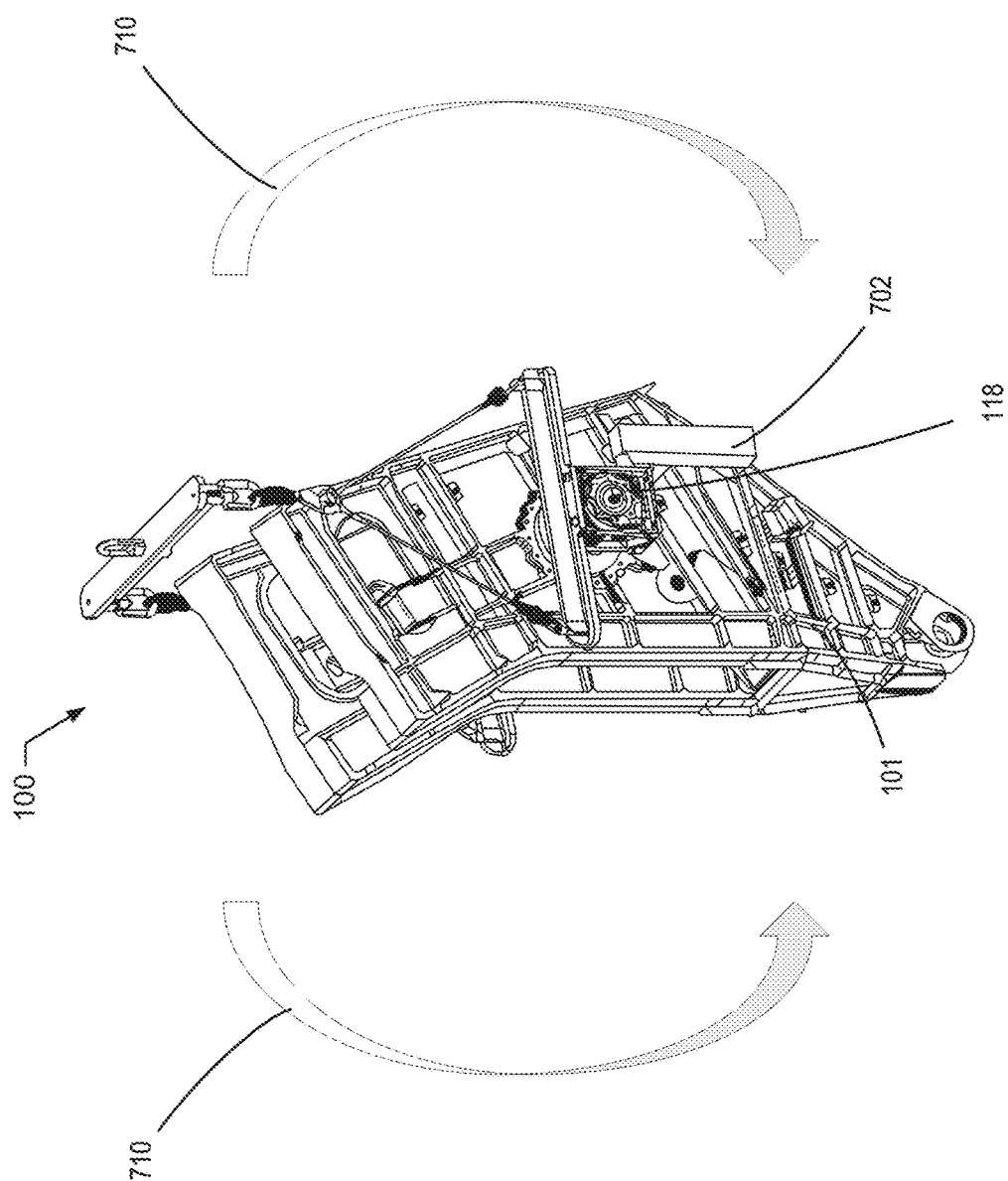
FIG. 7 illustrates example rotation of a component with the example rotation hoist shown in FIGS. 1 and 2.

FIG. 7 illustrates rotation of the component 101 with the example rotation hoist 100 shown in FIGS. 1 and 2. In the illustrated example of FIG. 7, the component 101 is rotated, as generally indicated by arrows 710, by the rotator 118 that is controlled by a tool (e.g., a socket tool, a pneumatic tool, an operator tool, etc.) 702, which may implement the motor/actuator 128, for example. In some examples, the tool 702 is utilized by an operator. In some other examples, the tool 702 is operated by a robot (e.g., as an effector placed onto the robot). The example tool 702 can be torque limited or speed limited.

Figure 8:
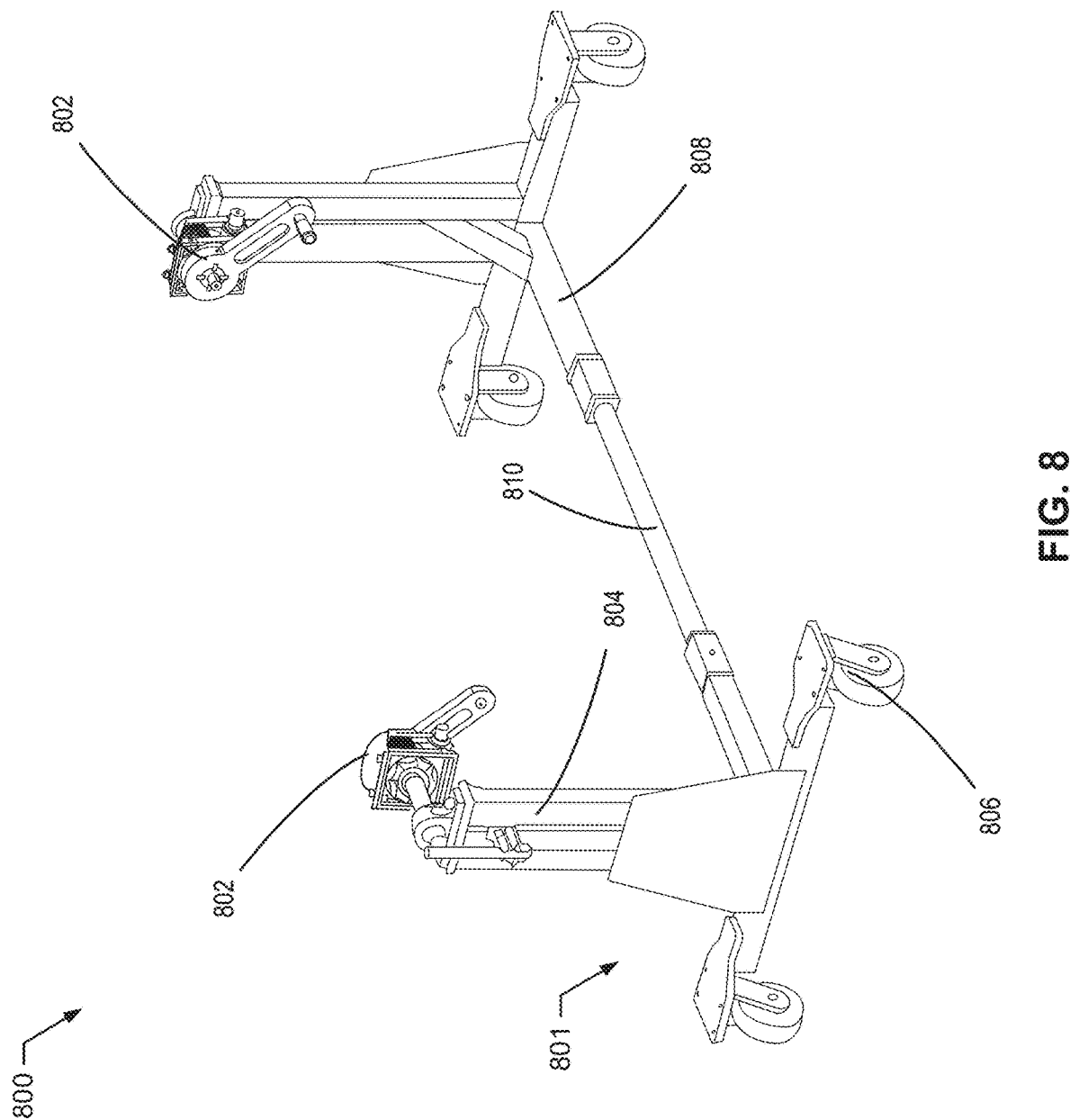
FIG. 8 illustrates an alternative example ground-based system in which examples disclosed herein can be implemented.

FIG. 8 illustrates an alternative example ground-based system 800 in which examples disclosed herein can be implemented. In this example, at least one rotation assembly 802, which can be similar to the example rotation assembly 110, is implemented on a ground-based cart 801. The cart 801 of the illustrated example also includes supports 804, wheels 806 and a spine 808 with a collapsible/expandable portion 810. In other examples, only one of the rotation assemblies 802 is utilized (e.g., an opposing end from the single rotation assembly 802 includes a bearing or other free-rotating component).

Figure 9A:
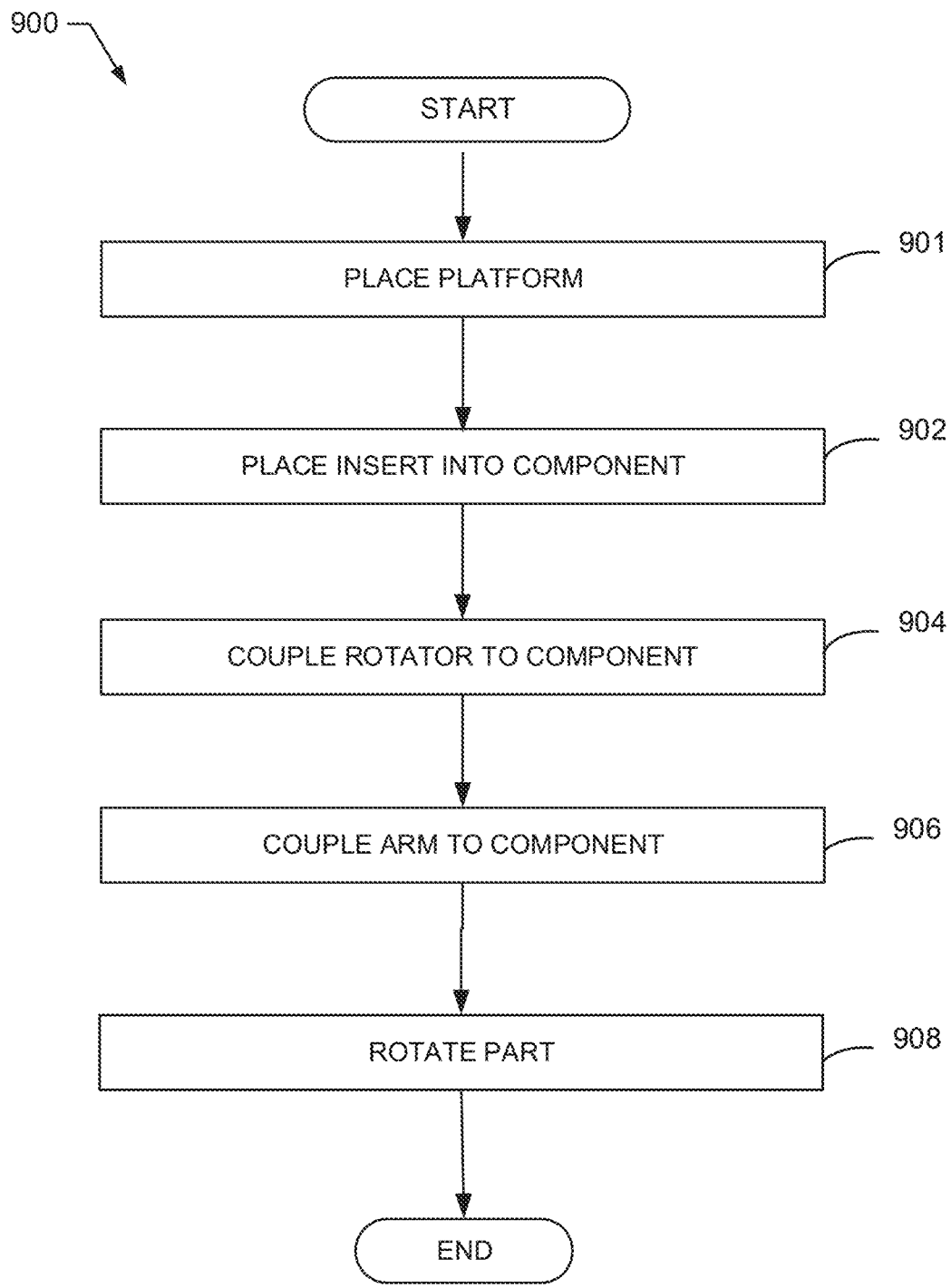
FIG. 9A is a flowchart representative of an example method to implement examples disclosed herein.
Figure 9B:
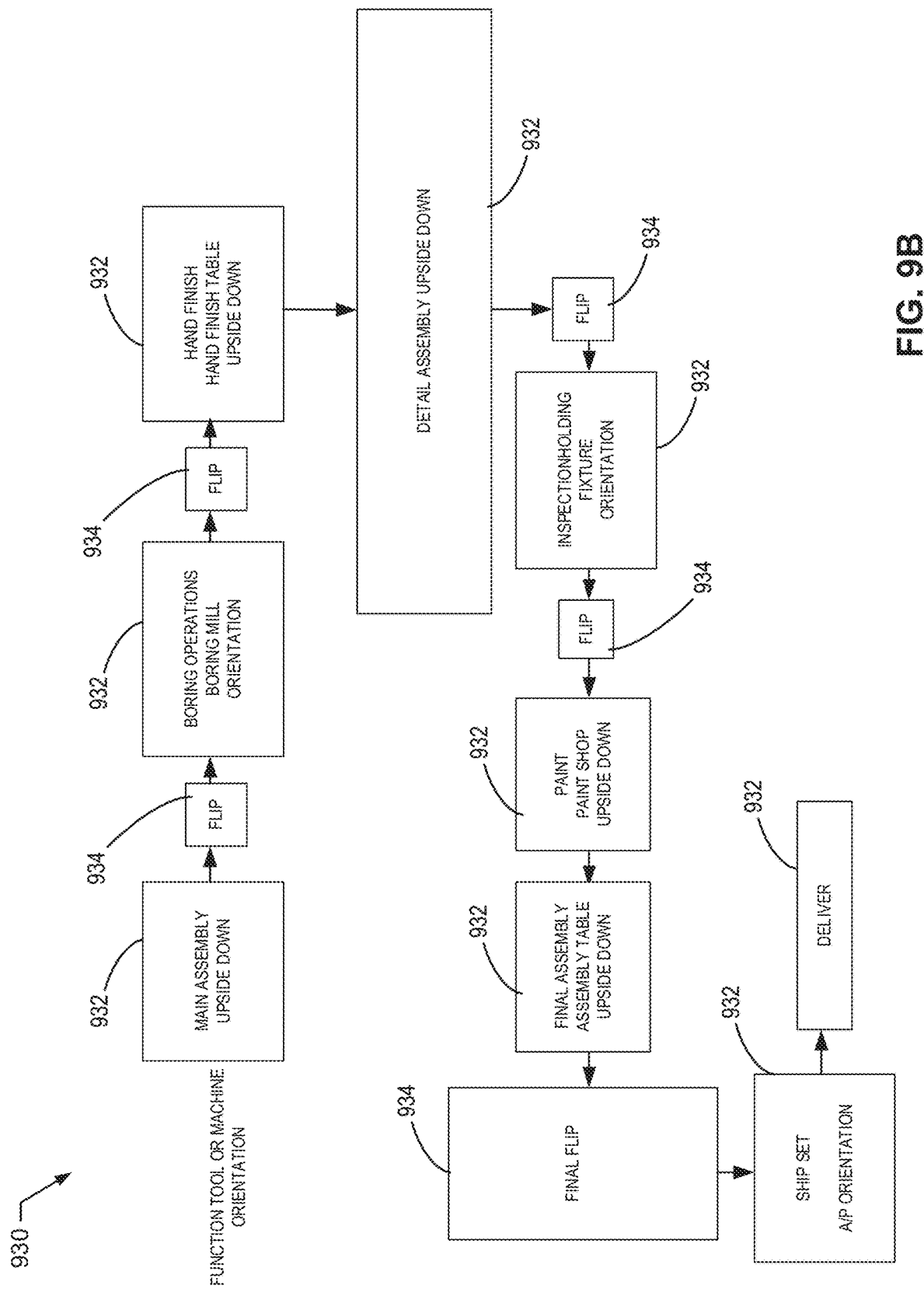
FIG. 9B is a flowchart representative of another example method to implement examples disclosed herein.

FIGS. 9A and 9B are flowcharts representative of example methods 900, 930 to implement examples disclosed herein. Turning to FIG. 9A, a flowchart of the example method 900 is shown. In the illustrated example, the component 101 is to be processed at different manufacturing steps or stages while being held in the rotation hoist 100.

At block 901, in some examples, the platform 114 is placed onto at least one of the cables 108. As a result, the platform 114 is supported by the at least one of the cables 108.

At block 902, in some examples, the insert 124 is placed into the component 101.

At block 904, the component 101 is coupled to the rotator 118 at the first position 130 of the component 101. In some examples, the component 101 is coupled to the rotator 118 at the insert 124.

At block 906, the arm 120 extending from the rotator 118 is coupled to the component at the second position 132 of the component 101 that is different from the first position 130.

At block 908, the arm 120 is rotated about the first position 130 by the rotator 118, thereby causing the component 101 to rotate and the process ends. In this example, the arm 120 is rotated by an operator with a tool. Further, the example arm 120 may be pivotably coupled to the component 101 at the second position 132.

Turning to FIG. 9B, an example method 930 is shown. The example method 930 illustrates how examples disclosed herein can be implemented to rotate and/or move the component 101 during and/or between multiple manufacturing steps. In particular, the component 101 is being moved and/or manipulated by the rotation hoist 100 at numerous steps during production. In other words, the component 101 is rotated (e.g., flipped) at multiple steps during production. As can be seen in the illustrated example of FIG. 9B, numerous processing steps 932 have numerous rotation/flipping steps 934 interspersed between. In some examples, a degree to which the component 101 is turned is based on a particular manufacturing step.

Figure 10:
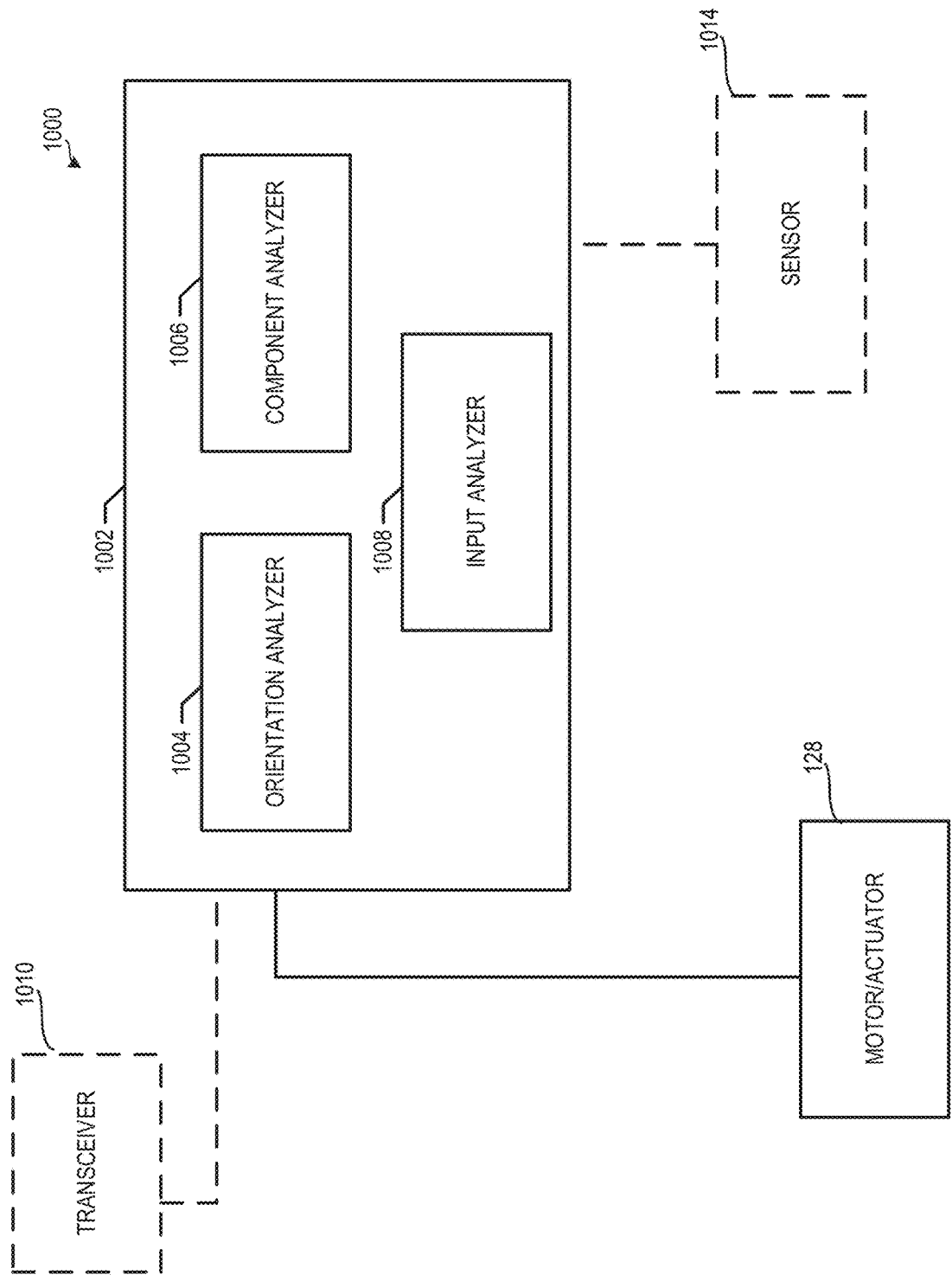
FIG. 10 is a schematic overview of an example rotation hoist control system that can implement examples disclosed herein.

FIG. 10 is a schematic overview of an example rotation hoist control system 1000 that can implement examples disclosed herein. The example rotation hoist control system 1000 can be implemented in the controller 125. In some examples, the rotation hoist control system 1000 is utilized to control the motor/actuator 128 that drives movement and/or rotation of the component 101. In the illustrated example, the rotation hoist control system 1000 includes a component movement controller 1002 which, in turn, includes an example orientation analyzer 1004, an example component analyzer 1006, and an example input analyzer 1008. In some examples, the component movement controller 1002 is communicatively coupled to a transceiver 1010, the motor/actuator 128 and/or a sensor 1014.

In operation, the component analyzer 1006 determines characteristics of the component 101. The characteristics can pertain to a weight of the component 101, a size of the component 101, dimension(s) of the component 101, etc. In some examples, the component analyzer 1006 determines and/or accounts for a center of gravity of the component 101. For example, the component analyzer 1006 takes into account the center of gravity of the component 101 in calculating a movement and/or torque of the arm 120. In some examples, the component analyzer 1006 determines a current orientation of the component 101.

The orientation analyzer 1004 of the illustrated example determines and/or calculates an orientation for the component 101. For example, the orientation analyzer 1004 determines an adjustment rotation of the component 101. This determination may be based on an input received from the transceiver 1010 and/or sensor data from the sensor 1014, for example. In some examples, the orientation analyzer 1004 takes into account the center of gravity of the component 101. Additionally or alternatively, the orientation analyzer 1004 determines an appropriate orientation of the component 101 for an operator based on a manufacturing process (e.g., an assembly process may be associated with a desired orientation of the component 101 for the operator, etc.).

In some examples, the input analyzer 1008 analyzes user or operator commands and/or sensor data from the sensor 1014. In some examples, the input analyzer 1008 analyzes user or operator commands received at the controller 126 via the network 129.

While an example manner of implementing the rotation hoist control system 1000 of FIG. 10 is illustrated in FIG. 10, one or more of the elements, processes and/or devices illustrated in FIG. 10 may be combined, divided, re-arranged, omitted, eliminated and/or implemented in any other way. Further, the example orientation analyzer 1004, the example component analyzer 1006, the example input analyzer 1008 and/or, more generally, the example rotation hoist control system 1000 of FIG. 10 may be implemented by hardware, software, firmware and/or any combination of hardware, software and/or firmware. Thus, for example, any of the example orientation analyzer 1004, the example component analyzer 1006, the example input analyzer 1008 and/or, more generally, the example rotation hoist control system 1000 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example orientation analyzer 1004, the example component analyzer 1006, and/or the example input analyzer 1008 is/are hereby expressly defined to include a non-transitory computer readable storage device or storage disk such as a memory, a digital versatile disk (DVD), a compact disk (CD), a Blu-ray disk, etc. including the software and/or firmware. Further still, the example rotation hoist control system 1000 of FIG. 10 may include one or more elements, processes and/or devices in addition to, or instead of, those illustrated in FIG. 10, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 11:
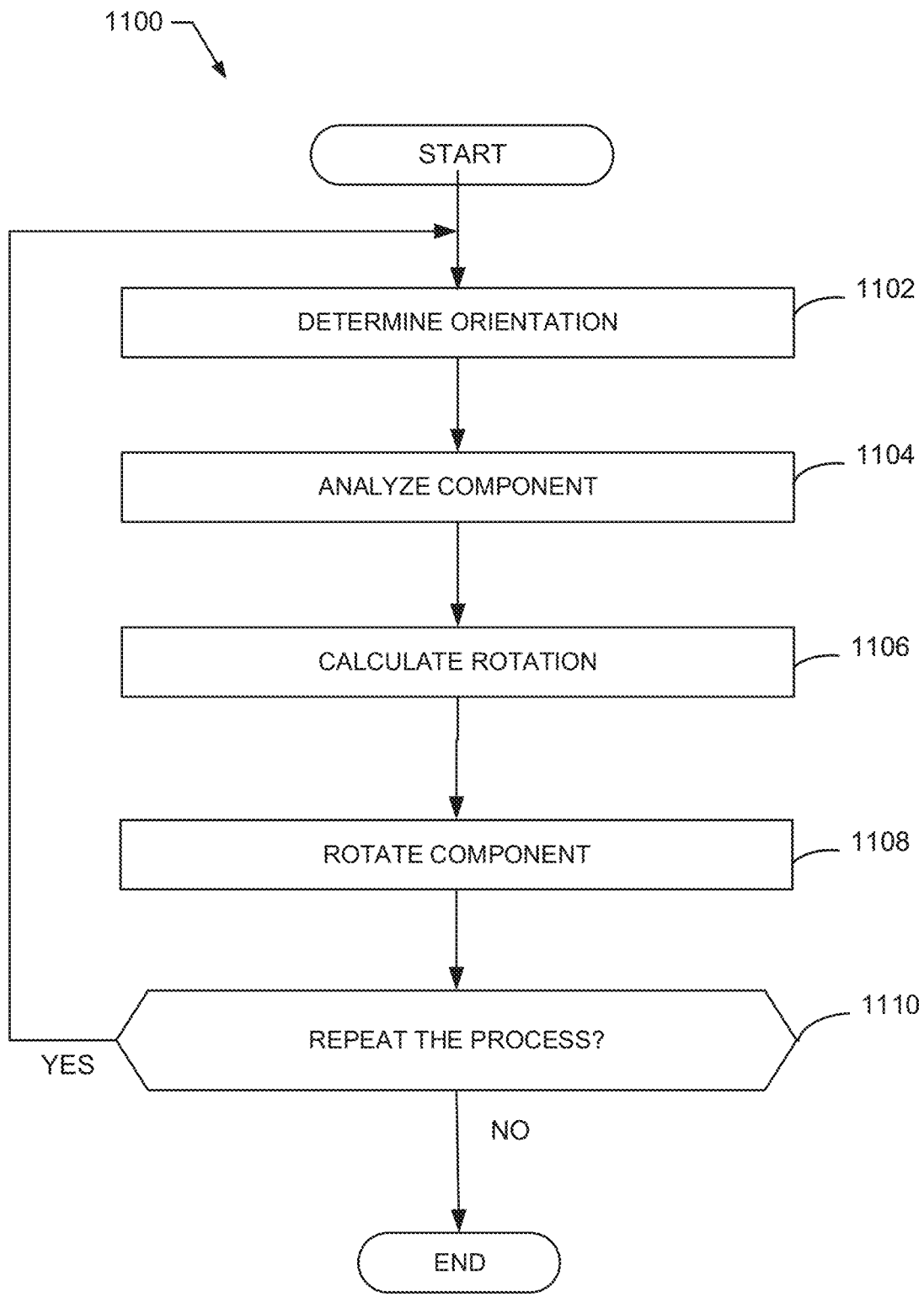
FIG. 11 is a flowchart representative of an example method for which machine readable instructions may be executed to implement the example rotation hoist control system of FIG. 10.

A flowchart representative of example hardware logic, machine readable instructions, hardware implemented state machines, and/or any combination thereof for implementing the rotation hoist control system 1000 of FIG. 10 is shown in FIG. 11. The machine readable instructions may be one or more executable programs or portion(s) of an executable program for execution by a computer processor and/or processor circuitry, such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example rotation hoist control system 1000 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 1100 of FIG. 11 begins as the component 101 is being moved and/or rotated during different steps of a manufacturing process, such as that shown in conjunction with the example method 930 of FIG. 9B. In this particular example, the component 101 is to be rotated via the motor/actuator 128 associated with the rotation hoist 100 as opposed to a tool utilized by an operator.

At block 1102, the component analyzer 1006 and/or the orientation analyzer 1004 determines a current orientation of the component 101.

At block 1104, the example component analyzer 1006 analyzes the component 101. For example, the component analyzer 1006 may determine a center of gravity or other mass characteristic of the component 101.

At block 1106, the component analyzer 1006 and/or the orientation analyzer 1004 calculate and/or determine a degree of rotation (e.g., an adjustment angle) to set the component 101 to. For example, the degree of rotation (e.g., angular displacement) may be based on operator inputs. Additionally or alternatively, the degree of rotation is calculated and/or determined based on a stage in manufacturing of the component 101.

At block 1108, the orientation analyzer 1004 causes the motor/actuator 128 to rotate the component to the calculated and/or determined degree of rotation.

At block 1110, the component analyzer 1006 determines whether the process is to end. If the process is to continue (block 1110), control of the process returns to block 1102. Otherwise, the process ends. This determination may be based on whether further manufacturing steps are to be applied to the component 101.

Figure 12:
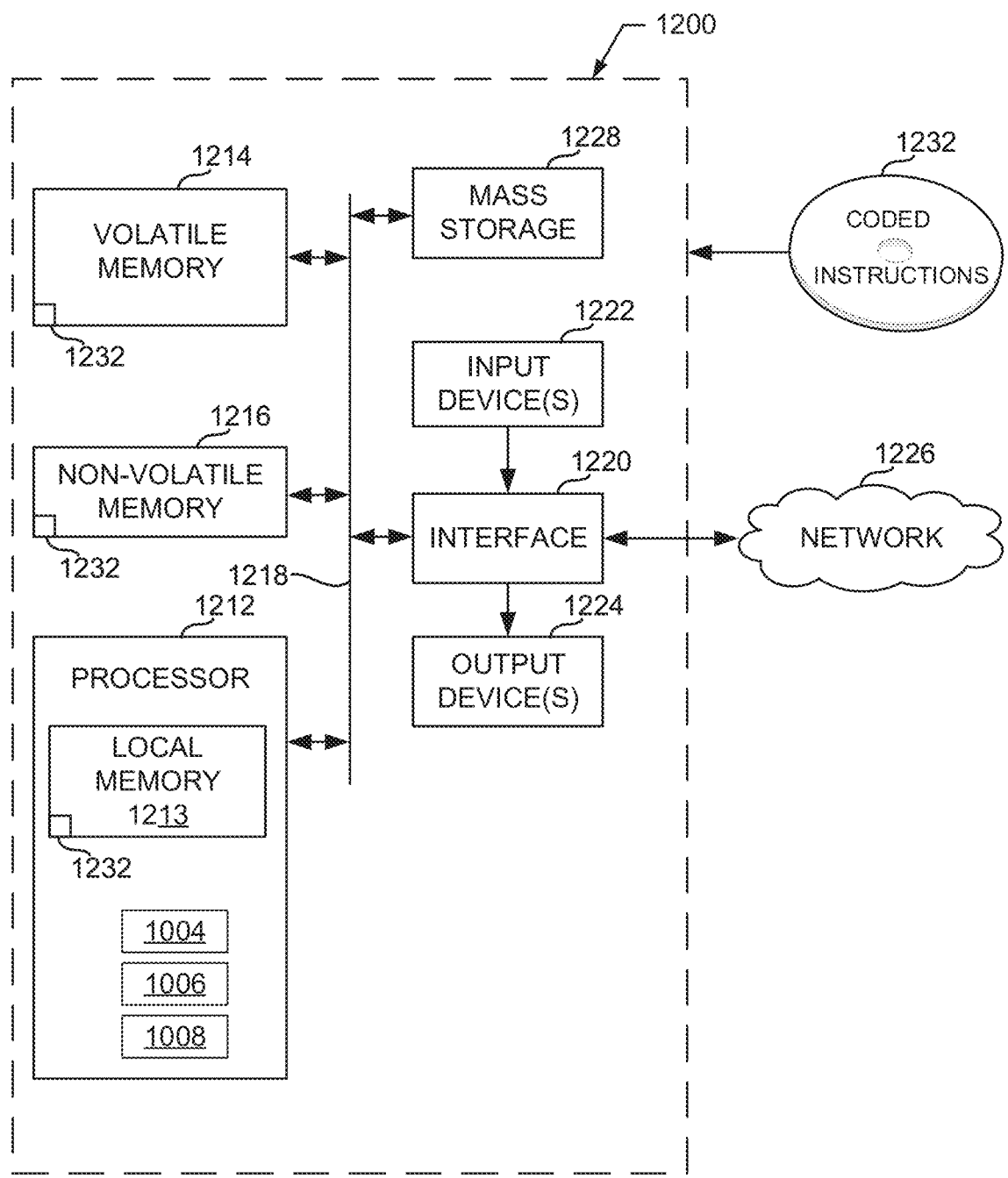
FIG. 12 is a block diagram of an example processing platform structured to execute the instructions of FIG. 11 to implement the example rotation hoist control system of FIG. 10.

FIG. 12 is a block diagram of an example processor platform 1200 structured to execute the instructions of FIG. 11 to implement the rotation hoist control system 1000 of FIG. 10. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example orientation analyzer 1004, the example component analyzer 1006 and the example input analyzer 1008.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 11 may be stored in the mass storage device 1228, in the volatile memory 1214, in the non-volatile memory 1216, and/or on a removable non-transitory computer readable storage medium such as a CD or DVD.

Example 1 includes a rotation hoist to support a component includes a platform having a first end and a second end opposite the first end, a body supported by the platform, a rotator supported by the body, the rotator couplable to the component at a first position of the component, and an arm extending from the rotator, the arm couplable to the component at a second position of the component different from the first position, the rotator to rotate the arm to rotate the component.

Example 2 includes the rotation hoist as defined in example 1, wherein the first position corresponds to a first aperture of the component, and wherein the second position corresponds to a second aperture of the component.

Example 3 includes the rotation hoist as defined in any of examples 1 or 2, further including at least one cable to support the platform at the first and second ends.

Example 4 includes the rotation hoist as defined in any of examples 1 to 3, further including an input to cause movement of the rotator with an operator tool.

Example 5 includes the rotation hoist as defined in any of examples 1 to 4, wherein the component is coupled to the rotation hoist via an insert, the insert to be inserted into the component and couplable to the rotator.

Example 6 includes the rotation hoist as defined in any of examples 1 to 5, wherein the rotator includes a gearbox.

Example 7 includes an assembly for supporting a component. The assembly includes an insert to be inserted into the component at a first position of the component, a rotator to be releasably couplable to the insert, the rotator to be supported by a body, and an arm extending from the rotator, the arm to be inserted into the component at a second position of the component different from the first position, the arm to be rotated via the rotator.

Example 8 includes the assembly as defined in example 7, wherein the insert is inserted into an aperture of the component positioned at the first position.

Example 9 includes the assembly as defined in any of examples 7 or 8, wherein the body is part of or coupled to a ground-based cart.

Example 10 includes the assembly as defined in any of examples 7 to 9, wherein the body is part of or coupled to a platform that is supported by at least one cable.

Example 11 includes the assembly as defined in any of examples 7 to 10, wherein the rotator includes a gearbox.

Example 12 includes the assembly as defined in example 11, further including an input operatively coupled to the gearbox.

Example 13 includes a method for moving a component. The method includes coupling, at a first position of component, the component to a rotator supported by a platform, coupling, at a second position of the component different from the first component, an arm to the component, the arm extending from the rotator, and rotating, via the arm, the component.

Example 14 includes the method as defined in example 13, further including placing an insert into the component, wherein the component is coupled to the rotator at the insert.

Example 15 includes the method as defined in any of examples 13 or 14, further including placing a cable onto the platform to support the platform.

Example 16 includes the method as defined in any of examples 13 to 15, wherein rotating the arm includes rotating an input operatively coupled to the rotator.

Example 17 includes the method as defined in example 16, wherein the input is rotated via an operator tool.

Example 18 includes the method as defined in any of examples 13 to 17, wherein rotating the arm includes driving a gearbox of the rotator.

Example 19 includes a tangible computer readable medium comprising instructions which, when executed, cause at least one processor to determine an orientation of a component operatively coupled to a rotator at a first position of the component, the rotator supported by a platform, calculate an adjustment rotation of the component, and cause, via an arm operatively coupled to the rotator, the component to rotate based on the adjustment rotation, the arm coupled to the component at a second position of the component different from the first position.

Example 20 includes the tangible computer readable medium of example 19, wherein the instructions further cause the at least one processor to calculate a center of gravity of the component.

From the foregoing, it will be appreciated that example methods, apparatus and articles of manufacture have been disclosed that enable relatively large components and/or workpieces to be rotated and moved with relative ease. Accordingly, examples disclosed herein can enable relatively shorter production and labor times. As a result, examples disclosed herein can reduce manufacturing costs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of manufacturing components, examples disclosed herein can be applied to any appropriate example in which an object is to be moved and/or manipulated.

The following claims are hereby incorporated into this Detailed Description by this reference, with each claim standing on its own as a separate embodiment of the present disclosure.

What is claimed is:

1. A rotation hoist to support a component, the rotation hoist comprising:
   a platform having a first end and a second end opposite the first end;
   a body supported by the platform;
   a rotator supported by the body, the rotator couplable to the component at a first position of the component;
   an arm extending from the rotator, the arm couplable to the component at a second position of the component different from the first position, the rotator to rotate the arm to rotate the component;
   an input to cause movement of the rotator with an operator tool; and
   a clutch to vary a degree of engagement between the input and at least one of the rotator or the arm.

2. The rotation hoist as defined in claim 1, wherein the first position corresponds to a first aperture of the component, and wherein the second position corresponds to a second aperture of the component.

3. The rotation hoist as defined in claim 1, further including at least one cable to support the platform at the first and second ends.

4. The rotation hoist as defined in claim 1, wherein the component is coupled to the rotation hoist via an insert, the insert to be inserted into the component and couplable to the rotator.

5. The rotation hoist as defined in claim 1, wherein the rotator includes a gearbox.

6. The rotation hoist as defined in claim 1, further including a pin to rotationally couple the rotator to the arm.

7. The rotation hoist as defined in claim 6, wherein the pin is a first pin and further including a second pin to rotationally couple the component to the arm.

8. An assembly for supporting a component, the assembly comprising:
   an insert to be inserted into the component at a first position of the component;
   a rotator to be releasably couplable to the insert, the rotator to be supported by a body;
   an arm extending from the rotator, the arm to be inserted into the component at a second position of the component different from the first position, the arm to be rotated via the rotator;
   an input to cause movement of the rotator with an operator tool; and
   a clutch to vary a degree of engagement between the input and at least one of the rotator or the arm.

9. The assembly as defined in claim 8, wherein the insert is inserted into an aperture of the component positioned at the first position.

10. The assembly as defined in claim 8, wherein the body is part of or coupled to a ground-based cart.

11. The assembly as defined in claim 8, wherein the body is part of or coupled to a platform that is supported by at least one cable.

12. The assembly as defined in claim 8, wherein the rotator includes a gearbox.

13. A method for moving a component, the method comprising:
   coupling, at a first position of the component, the component to a rotator supported by a platform;
   coupling, at a second position of the component different from the first position, an arm to the component, the arm extending from the rotator; and
   rotating, via the arm, the component, wherein a clutch is to vary a degree of engagement between (i) an input operatively coupled to the rotator and (ii) at least one of the rotator or the arm.

14. The method as defined in claim 13, further including placing an insert into the component, wherein the component is coupled to the rotator at the insert.

15. The method as defined in claim 13, further including placing a cable onto the platform to support the platform.

16. The method as defined in claim 13, wherein rotating the arm includes rotating the input.

17. The method as defined in claim 16, wherein the input is rotated via an operator tool.

18. The method as defined in claim 13, wherein rotating the arm includes driving a gearbox of the rotator.

19. A tangible computer readable medium comprising instructions which, when executed, cause at least one processor to:
   determine an orientation of a component operatively coupled to a rotator at a first position of the component, the rotator supported by a platform;
   calculate an adjustment rotation of the component; and
   cause, via an arm operatively coupled to the rotator, the component to rotate based on the adjustment rotation, the arm coupled to the component at a second position of the component different from the first position, wherein a clutch is to vary a degree of engagement between (i) an input operatively coupled to the rotator and (ii) at least one of the rotator or the arm.

20. The tangible computer readable medium of claim 19, wherein the instructions further cause the at least one processor to calculate a center of gravity of the component.

* * * * *